(12) United States Patent
Wong et al.

(10) Patent No.: US 12,298,788 B1
(45) Date of Patent: May 13, 2025

(54) SYSTEM AND METHOD FOR AIRBORNE SUNLIGHT MANAGEMENT FILMS

(71) Applicants: Pok Yuen Wong, Beijing (CN); Chi Fui Ni, Shanghai (CN); Chenyu Chou, Chengdu (CN); Zenghan Feng, Medford, MA (US); Angela Jin, Andover, MA (US); Peixuan Song, Xi'an (CN); Jian Jim Wang, Belle Mead, NJ (US)

(72) Inventors: Pok Yuen Wong, Beijing (CN); Chi Fui Ni, Shanghai (CN); Chenyu Chou, Chengdu (CN); Zenghan Feng, Medford, MA (US); Angela Jin, Andover, MA (US); Peixuan Song, Xi'an (CN); Jian Jim Wang, Belle Mead, NJ (US)

(73) Assignees: Pok Yuen Wong, Beijing (CN); Chi Fui Ni, Shanghai (CN); Chenyu Chou, Chengdu (CN); Zenghan Feng, Medford, MA (US); Angela Jin, Andover, MA (US); Peixuan Song, Xi'an (CN); Jian Jim Wang, Belle Mead, NJ (US)

( * ) Notice: Subject to any disclaimer, the term of this patent is extended or adjusted under 35 U.S.C. 154(b) by 0 days.

(21) Appl. No.: 18/963,525

(22) Filed: Nov. 28, 2024

(51) Int. Cl.
G05D 1/698 (2024.01)
A01G 15/00 (2006.01)
(Continued)

(52) U.S. Cl.
CPC ........... *G05D 1/6987* (2024.01); *A01G 15/00* (2013.01); *B64U 10/13* (2023.01); *B64U 50/31* (2023.01); *G05D 1/46* (2024.01); *G05D 1/693* (2024.01); *B64U 2101/10* (2023.01); *B64U 2101/40* (2023.01); *B64U 2201/20* (2023.01); *G05D 2105/00* (2024.01); *G05D 2107/21* (2024.01); *G05D 2109/254* (2024.01)

(58) Field of Classification Search
None
See application file for complete search history.

(56) References Cited

U.S. PATENT DOCUMENTS

| | | | |
|---|---|---|---|
| 11,708,704 B2 * | 7/2023 | Aintabi | E04H 15/04 135/90 |
| 12,207,713 B2 * | 1/2025 | Aintabi | B60L 8/003 |

(Continued)

*Primary Examiner* — Peter D Nolan
*Assistant Examiner* — Michael F Whalen
(74) *Attorney, Agent, or Firm* — Treasure IP Group, LLC

(57) ABSTRACT

System and method for to reduce ground surface temperature for an area using a fleet of drones is described. Each drone in the fleet comprises multiple motors, a body with a first and second end, and a surface equipped with sunlight management films. These films are designed to reflect sunlight and convert it into electricity for charging onboard batteries. A Ground Control Station (GCS) is communicatively coupled to the fleet, enabling synchronized transmission of a flight program and a sunlight management program. These programs are designed to track the geoposition of the drones and align their operations with real-time environmental data. The GCS is further integrated with an environmental sensor for measuring ground surface temperature and sending input data for temperature tracking.

20 Claims, 5 Drawing Sheets

(51) Int. Cl.
  *B64U 10/13*   (2023.01)
  *B64U 50/31*   (2023.01)
  *G05D 1/46*   (2024.01)
  *G05D 1/693*   (2024.01)
  B64U 101/10   (2023.01)
  B64U 101/40   (2023.01)
  G05D 105/00   (2024.01)
  G05D 107/20   (2024.01)
  G05D 109/25   (2024.01)

(56) References Cited

U.S. PATENT DOCUMENTS

| | | | | |
|---|---|---|---|---|
| 2016/0219800 | A1* | 8/2016 | Choi | G02B 19/00 |
| 2020/0096731 | A1* | 3/2020 | Komerath | A01G 15/00 |
| 2023/0132459 | A1* | 5/2023 | Aintabi | H02S 30/20 |
| | | | | 701/4 |
| 2023/0132543 | A1* | 5/2023 | Aintabi | H02S 20/23 |
| | | | | 135/98 |
| 2023/0349188 | A1* | 11/2023 | Aintabi | H02S 20/23 |
| 2024/0093528 | A1* | 3/2024 | Aintabi | E04H 15/04 |

* cited by examiner

SYSTEM AND METHOD FOR AIRBORNE SUNLIGHT MANAGEMENT FILMS

FIELD OF INVENTION

The present invention relates to the field of climate control, specifically using airborne sunlight management film to achieve local climate control for example modulate temperature for a specific area to enhance plant and agriculture crop growth.

BACKGROUND

Controlling ground temperature is a transformative approach in modern agriculture, enabling more precise and favorable conditions for agriculture growth. Temperature plays a critical role in germination, root development, nutrient absorption, and overall plant health. By actively managing ground temperatures, farmers can extend growing seasons, enhance agriculture resilience against temperature fluctuations, and reduce risks associated with extreme weather conditions. This control is particularly beneficial in regions experiencing excessive summer heat and draught, allowing for extended cultivation and protection against temperature-induced stress.

Solar energy is a renewable and sustainable source of power that offers significant benefits in the long run. Over the past few decades, the cost of solar panels and related technologies has decreased significantly, making solar energy more accessible and affordable. Rooftop solar systems are not only proven to be positive ROI (return on reinvestment) but also require minimal maintenance, have no fuel costs, and can reduce strain on the grid by providing power close to where it is consumed. This localized energy generation not only enhances grid stability but also reduces energy transmission losses.

In urban and suburban areas, temperature control for enclosed area has been very mature and rooftop solar has become increasingly popular due to these advantages. However, open area temperature has bear forbidden cost and not all areas are suited for rooftop installations whether due to the absence of buildings, unsuitable roof structures, or other constraints. To overcome these challenges and make solar energy more widely accessible, innovative solutions are needed.

The need for temperature regulation in an open space and recent advancements in solar technology, such as building-integrated photovoltaics (BIPV) and solar-powered transportation, have expanded the possibilities for solar energy use beyond traditional rooftops. Additionally, improvements in photo-to-electrical conversion efficiency, particularly in solar harvesting fabrics, have opened new avenues for solar energy utilization.

SUMMARY OF THE INVENTION

The present invention discloses an airborne temperature control platform, such as a plurality of drones equipped with sunlight management films, offer easy scalability, flexibility, and reduced land support requirement. These platforms can be deployed in a variety of environments, providing a versatile method for reduce excessive summer heat and draught, even capturing solar energy where traditional prevention or solar cell installations are impractical.

A primary object of the present invention is to provide an airborne sunlight management platform to regulate temperature and protect forest and agriculture agricultures from heat stress. By deploying sunlight management films over designated farm areas, these sunlight management films on drones can create shade, mitigating the effects of extreme heat on agricultures and harvest sun light to generate electricity. This dual-purpose approach provides a sustainable way to protect agricultural yields while simultaneously harnessing solar power.

It is another object of the present invention to provide a plurality of airborne sunlight management films to harvest the solar powers so that the airborne devices can be energy self-sufficient in using solar power to power its own while suspended in the sky.

It is another object of the present invention is to provide an easily adaptable airborne sunlight management films to harvest the solar powers to move in accordance with sun in a large area.

It is an ultimate object of the present invention to provide a widespread adoption of such innovative solar solutions to maximize environmental benefits, reduce reliance on fossil fuels, and decreasing greenhouse gas emissions in the air arena on a global scale. By expanding the use of solar energy beyond rooftops to include airborne platforms and other advanced technologies, we can further combat climate change and ensure a more sustainable energy future.

On a first aspect of the present invention, it is disclosed a system of airborne sunlight management solution. The system for reducing ground surface temperature over a designated area comprises a fleet of drones, each equipped with a body, multiple motors, and a first set of sunlight management films positioned along the surface area of the drone body. Each drone is designed with a first and second end, between which a second set of sunlight management films is configured to both reflect sunlight and convert it to electricity to recharge the drone's onboard battery.

The Ground Central Drone Control Station (GCDCS) is communicatively coupled to the fleet of drones and is configured to transmit synchronized flight and sunlight management programs. The flight program includes a timestamp and designated geoposition for each drone, while the sunlight management program specifies the operational state (collapsible or expanded) of each sunlight management film and the orientation thereof. These programs facilitate real-time monitoring and coordination of each drone's geolocation and orientation. The system further comprises an environmental sensor configured to monitor and track ground surface temperatures within the target area, transmitting temperature data to the GCDCS. This temperature data enables the GCDCS to make dynamic adjustments to drone positioning and sunlight management film deployment, thereby optimizing temperature control across the target area.

Each drone within the fleet is equipped with an onboard controller, allowing it to receive and execute the GCDCS-provided flight program, thereby positioning the drones to align with a targeted ground surface temperature map and ensuring effective temperature distribution control. The sunlight management films on each drone are composed of both sunlight-reflective and sunlight-harvesting properties, maximizing efficiency. The distance between drones is dynamically managed based on geolocation and the desired ground surface temperature, and the density of the sunlight management films is controlled in alignment with the fleet's geolocation and variations in ground surface temperature, with data fed from the GCDCS in real time. The orientation of these sunlight management films can be adjusted according to planned activity timestamps and fleet positioning relative to the target temperature zones. Additionally, each drone is equipped with optional environmental sensors, such as humidity, wind speed, and pressure sensors, allowing the system to adjust drone positioning and orientation based on real-time environmental conditions. Finally, the GCDCS dynamically adjusts the number of deployed drones to meet the target area's size and temperature requirements, ensuring optimal temperature regulation and coverage.

On a second aspect of the present invention, it is disclosed a method of using said airborne sunlight management system with a fleet of drones.

The method for enhancing agricultural growth and productivity is provided by managing ground surface temperature and light exposure in agriculture-growing areas. This method involves deploying a fleet of drones, each equipped with an onboard controller to monitor and control its geolocation and orientation. Each drone is fitted with a transformer sunlight management film capable of switching between a collapsible and an expandable state. Initially, each drone is secured with the sunlight management film in its compact, collapsible state. An environmental sensor is used to monitor ground surface temperatures in the target area, sending temperature data to a Ground Central Drone Control Station (GCDCS). Based on this temperature information, the GCDCS sends instructions to the drone fleet, including a flight program that directs the drones to specific locations where they anchor and expand their sunlight management films at designated times and durations.

The GCDCS also tracks each drone's individual geolocation and orientation throughout its operation through its individual onboard controller. The onboard controllers receive and execute these instructions, unfolding the sunlight management films to an expanded state. The method further involves adjusting the density of the drone fleet with expanded films according to a target ground surface temperature map, enabling the drones to regulate temperature distribution effectively across the designated area.

In this method, the geolocation of each drone includes GPS data, while orientation is defined by the relative positioning between the drone's ends. The sunlight management film can be selected from reflective, solar-harvesting, or hybrid types. When in its collapsible state, the film is rolled or folded compactly; in its expandable state, it is fully extended to maximize surface exposure. The film's boundary contact may be a single corner, two corners, or an edge of the film. Additional drones can be deployed to provide structural support for the sunlight management film as needed, and the number of drones and film coverage area are calculated based on a target temperature map.

Real-time tracking and response mechanisms are included to adjust for changes in sunlight angles, enhancing energy efficiency. The method also adjusts the tilt angle of the sunlight management films based on wind speed and direction for added stability. When needed, the sunlight management film can be retracted by withdrawing a tension cable, allowing the drone to maintain its altitude position. The method further includes returning the sunlight management film to a storage compartment on the drone, preparing it for subsequent deployment, repositioning it to another area, or, alternatively, supporting the film between two drones without retracting it for continuous use in a new location.

Additional features of the method include storing excess solar energy harvested by the sunlight management film in onboard batteries, allowing future power use by the drones. A fail-safe mechanism is also provided, automatically retracting the sunlight management film and returning the drone to its base location if wind speed exceeds a predetermined threshold, ensuring operational safety.

DETAILED DESCRIPTION OF INSTANCES OF THE DISCLOSURE

Figure 1:
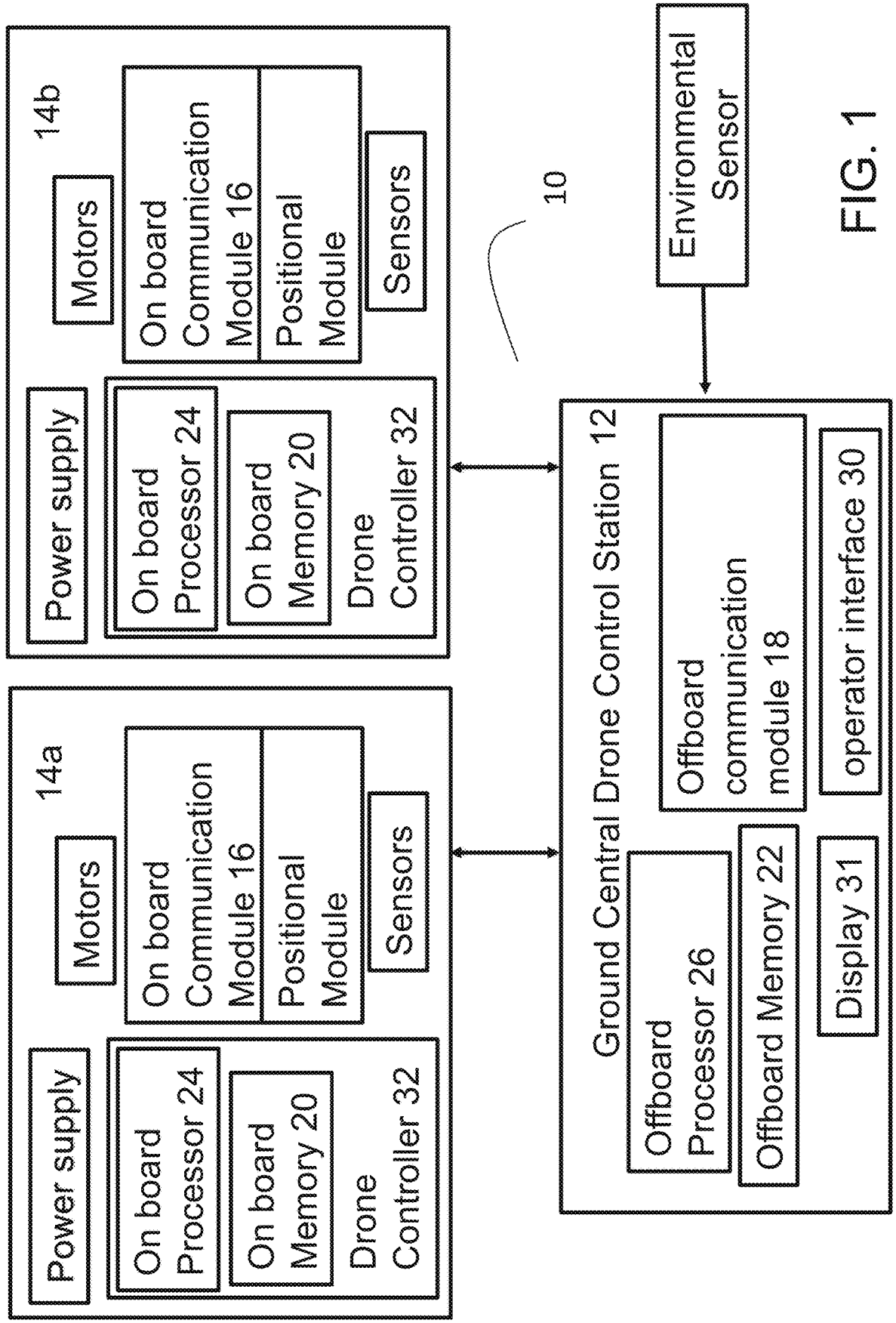
FIG. 1 is a schematic illustration of the drone system, according to one embodiment of the present invention, wherein each drone communicates with central communication directly.

The following will describe in great details the preferred instances of the present disclosure by combining with the accompanying drawings; however, the present disclosure is not restricted to these instances. The present disclosure covers any replacement, modification, equivalent methods and solutions made within the sprits and scopes of the present disclosure.

Solar farms and roof top solar solutions are emerging as a valuable residential market. A flexible solution in agricultural and environmental management, for example using sunlight management film supported by drones offers a unique solution to regulate ground surface temperatures in targeted areas. As sustainable practices gain popularity, there is an increasing demand for drones equipped with solar cells, as they provide a quieter, cleaner, and more flexible alternative to traditional shading methods (e.g., nets, physical covers).

In another application scenarios, the present invention is configured to cover a small area open space, for example a vegetable garden. A distributed shading effect composed of multiple solar-reflective surfaces (e.g., a single drone with onboard solar panels). Typically, achieving greater temperature reduction across a wide area can be costly. Additionally, managing larger drone fleets requires more time and resources, as each drone's flight and positioning must be programmed and synchronized to ensure comprehensive coverage. This method, however, holds promise for scalable, reusable shading and cooling applications in agriculture and urban environments.

This disclosure is directed to an air-borne drone system designed to manage ground surface temperature and light exposure in agricultural areas, improving crop productivity. Unlike traditional shading techniques, this drone system reduces the need for fixed infrastructure by deploying a fleet of drones equipped with transformer sunlight management films, capable of switching between collapsible and expandable states. The air-borne drone system includes a (GCDCS) that transmits a synchronized flight and sunlight management program to the fleet, allowing the drones to be positioned dynamically based on real-time environmental data. Each drone is outfitted with sunlight management films that reflect sunlight and, preferably in some cases, harvest solar energy to charge the drone's onboard battery. The GCDCS monitors ground surface temperatures through environmental sensors and adjusts the drone fleet's configuration, ensuring optimal temperature distribution over the target area.

Through precise control of each drone's geolocation and orientation, the system can deploy the sunlight management films in patterns that regulate heat and light exposure, dynamically adjusting the density of the fleet as needed to meet target temperature requirements. In this manner, the drone system offers a flexible, efficient solution to temperature regulation in agriculture, enhancing sustainability and crop growth potential across varied environmental conditions.

Drone and Ground Communication

Figure 2:
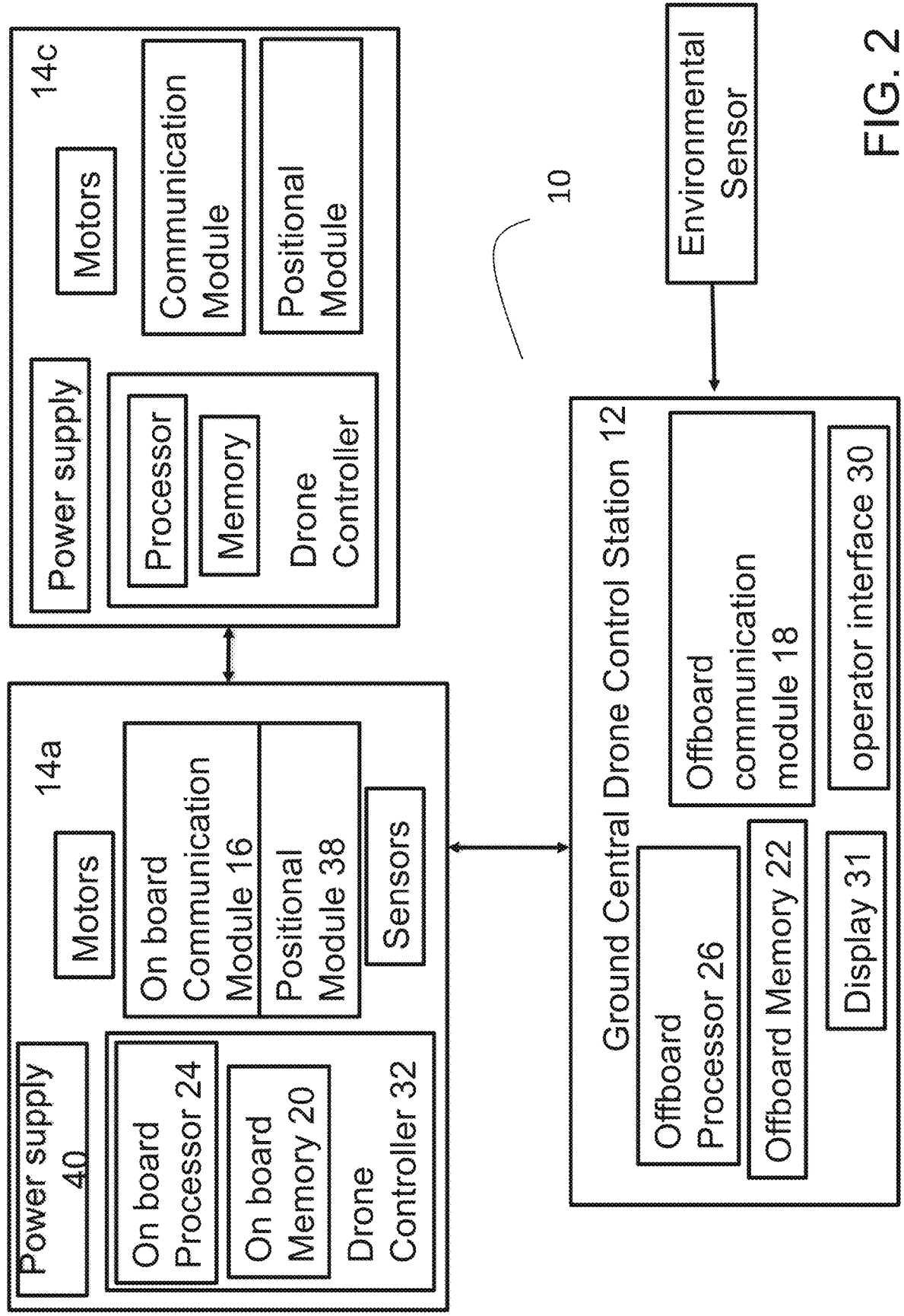
FIG. 2 is a schematic illustration of the drone system, according to an alternative embodiment of the present invention, wherein not each drone communicates with central communication directly, one slave drone communicates with a master drone.
Figure 3:
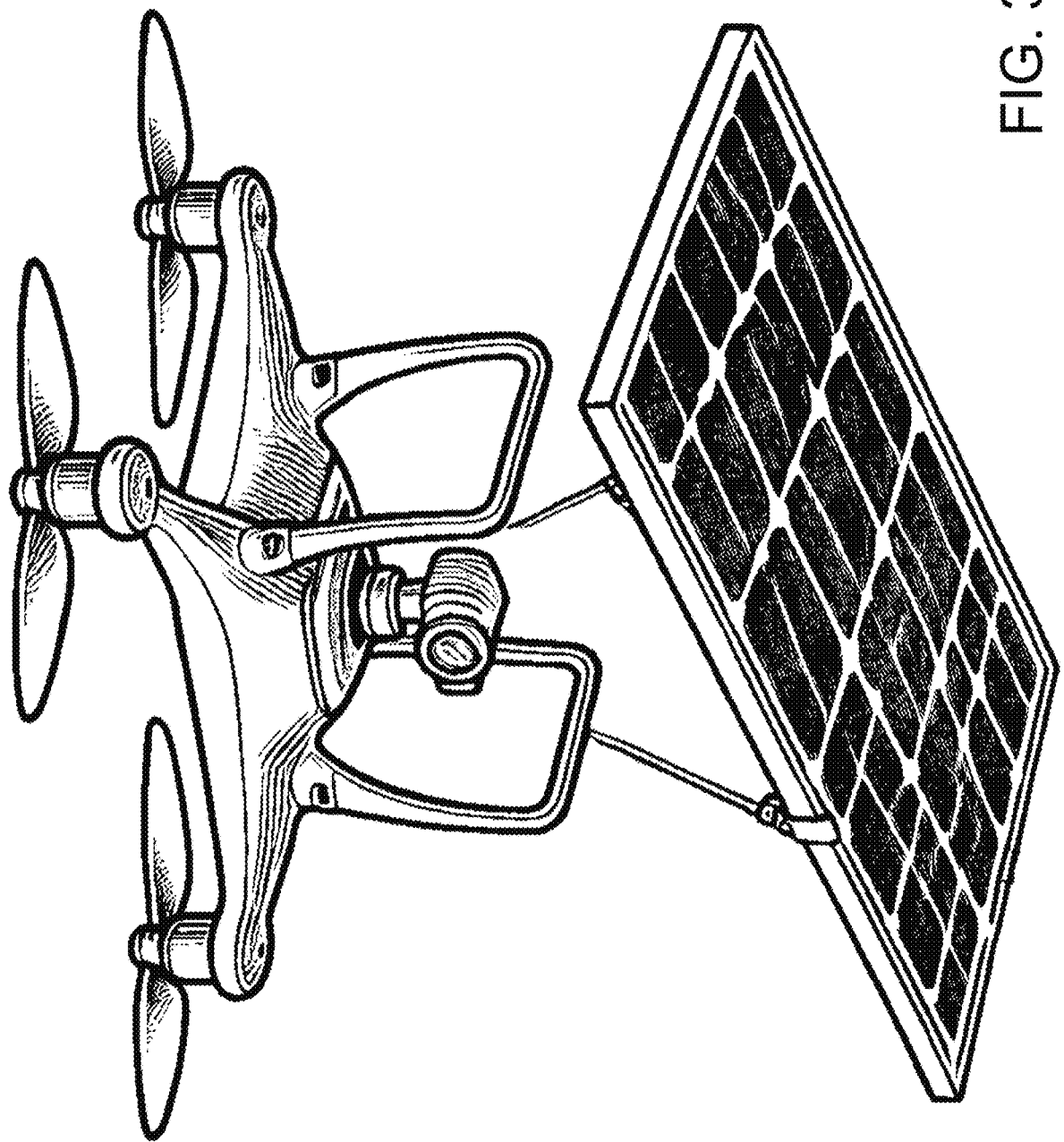
FIG. 3 is an illustration sunlight management film is supported by only one drone.

By way of introduction, FIG. 1 and FIG. 2 are block diagrams of two embodiments of the air borne drone system 10, in accordance with the present disclosure. The air borne drone system 10 may include a fleet of drones 14 (e.g., single rotor drones, multi-rotor drones, quadcopters, and so on) and a Ground Central Drone Control Station 12 configured to send instructions to the fleet of drones 14. In the first embodiment, illustrated in FIG. 1, each drone communicates with Ground Central Drone Control Station 12 directly, which enable them to operate together in a coordinated, collective manner, so called swarm drones. Swarming drones use decentralized control and communicate with each other, often through AI-driven algorithms, to perform tasks collectively, such as flying in formation, covering large areas, or avoiding obstacles.

In the illustrated embodiment, the fleet of drones 14 includes three drones 14a, 14b, 14c that are representative of any number of drones. The fleet of drones 14 and the Ground Central Drone Control Station 12 include communications circuitry (e.g. onboard communications circuitry 16 and offboard communications circuitry 18), such as antennas, radio transceiver circuits, and signal processing hardware and/or software (e.g., hardware or software filters, A/D converters, multiplexers amplifiers), or a combination thereof, and that may be configured to communicate over wireless communication paths via Infrared (IR) wireless communication, satellite communication, broadcast radio, Microwave radio, Bluetooth, Zigbee, Wi-fi, UHF, NFC, etc.

Additionally, one or both of the fleet of drones 14 and the Ground Central Drone Control Station 12 may include a memory device (e.g., onboard memory device 20 and/or offboard memory device 22) for storing instructions executable by one or more processors (e.g., onboard processor 24 and/or offboard processor 26) to perform the methods and control actions described herein. The processor may include one or more processing devices, and the memory may include one or more tangible, non-transitory, machine-readable conductive. The memory may include volatile memory, such as random access memory (RAM), and/or non-volatile memory, such as read-only memory (ROM), optical drives, hard disc drives, solid-state drives, or any other non-transitory computer-readable medium that includes instructions. For example, the Ground Central Drone Control System 12 may be accessed by an operator interface 28 (e.g., a computer-based workstation or a mobile device), and/or may include an input/output interface 30 and a mission 31. In one example, the display 31 may be a touch display capable of receiving inputs from a user. While the Ground Central Drone Control System 12 may be implemented as a separate device or devices from the fleet of drones 14, it should be understood that certain functionality disclosed as part of the Ground Central Drone Control System 12 may be additionally or alternatively implemented within the fleet of drones 14.

As illustrated, the fleet of drones 14 may contain at least one drone controller 32 that controls the execution of a flight plan or flight path for the fleet of drones 14. In one embodiment, the Ground Central Drone Control System 12 communicate and controls both drones 14a and 14b as indicated simultaneously.

In the second embodiment, with respect to controlling flight plan or flight path execution, a single drone, a master drone, (e.g., drone 14a in the illustrated embodiment) may include the drone controller 32 and manage additional drones (e.g., drones 14c, slave drones) that do not have their own drone controller or even they have their drone controllers, their drone controllers only communicate with the single drone, master drone. For example, the drone 14a may be a master drone with the communications circuitry 16, the memory 20, and the processor 24, and may send instructions to drones, 14c (which represent any number of drones) to execute the flight plans. This arrangement may be facilitated by communication between the drones 14a, 14b, 14c through their communication module or a communicatively coupling the drones 14a, 14b, 14c together. However, in a different embodiment, each drone 14a, 14b, 14c of the fleet of drones 14 may include a respective sensor or aspect of the drone controller 32 to facilitate coordination amongst the fleet of drones 14. More specifically, for example, each drone of the fleet of drones 14, may include an onboard sensor or aspect of the drone controller 32 with the communications circuitry 16, the memory 20, and the processor 24, and may each individually execute flight plans and communicate back and forth. The flight plan may be communicated from the Ground Central Drone Control Station 12 (e.g., in real-time) or may be pre-programmed and stored in the onboard memory 20 and/or offboard the memory 22. Further, in certain embodiments, operator input may be implemented in real-time to generate a flight plan and/or may override previous flight plan instructions. The drone controller 32 controls the operation of motors 34 and other flight components of the fleet of drones 14 to execute the desired flight plan.

The air borne drone system 10 may also include electronic conductive tethers 36 which may include an electronic conductive tether, line, cable, cord, power strip, or first set of solar cells coupled to each drone (e.g., drones 14a, 14b, 14c) of the fleet of drones 14. The electronic conductive tethers 36 may facilitate electronic communication with and between the solar cell to the individual drones (e.g., drones 14a, 14b, 14c) of the fleet of drones 14. In the present disclosure, the electronic conductive tethers 36 transfer energy harvested by the sunlight management films to the drone power supply. The electronic conductive tethers 36 may be one single unit coupled to each drone or multiple units designed to couple each drone to each sunlight management film. In an embodiment, the electronic conductive tethers 36 may include a plurality of rigid segments serially attached together via articulating couplings. In another embodiment, the electronic conductive tethers 36 may be flexible to allow for an additional range of motion and transformation between collapsible and expanded states. Further, the electronic conductive tethers 36 may be coupled to a power source 40 that is configured to give power to the fleet of drones 14. For example, the power source may be an electrical connection to the power source 40 external to the fleet of drones 14. Each drone may include its own power supply 41, such as a battery, which may operate independently or receive power via the electronic conductive tethers 36 (e.g., from the power source 40). In addition to providing power, the electronic conductive tethers 36 may facilitate communication, via a communication bus, between each member of the fleet of drones 14, which may improve the timing of communication and reduce latency. In some embodiments, the electronic conductive tethers 36 may is attached to the back of the sunlight management films, which also include orientation sensors to measure orientation of the sunlight management film. The orientation sensor, in one example, an inclinometer. In another example is a level. The orientation sensor measure angle between the sunlight management film and the ground surface.

The fleet of drones 14 may also include telemetry and/or position circuitry 38 (e.g., positioning sensors) to provide navigation or guidance information to Ground Central Drone Control Station 12 to use as feedback for determining whether the air borne mission is being executed as intended. Accordingly, the fleet of drones 14 may use location information determined by the telemetry and/or position circuitry 38, such as GPS information accessed from a GPS chip, triangulation information from radio communication, and/or feedback from one or more cameras, position sensors, or proximity sensors on the fleet of drones 14. For example, the telemetry and/or position circuitry may be used to determine a drone in the fleet of drones 14 is in the wrong position based on its geographic location or GPS coordinates and is thus not missioning the proper air borne image. Telemetry and/or position circuitry 38 may also provide feedback to keep the fleet of drones 14 outside a particular boundary to prevent guest interference with the drones.

In some embodiments, the air borne drone system 10 may include the fleet of drones 14 coupled together via the electronic conductive tethers 36 in the form of a mesh (e.g. interwoven or intertwined material). The mesh may include a plurality of sunlight management films extending along the material. The fleet of drones 14 may be instructed by the Ground Central Drone Control Station 12 to fly according to a planned mission to support each corner of the mesh.

The air borne drone system 10 may execute instructions from the Ground Central Drone Control Station 12 or the drone controller 32 to define a first air borne position and then a second air borne position based on a planned mission. For example, the air borne drone system 10 may position the fleet of drones 14 to provide a first density (first air borne position) and then a second density (second air borne position) at a later time. The air borne drone system 10 may include position circuitry 38 (e.g., a first positioning sensor on a first drone and a second positioning sensor on a second drone) and the Ground Central Drone Control Station 12 and/or the drone controller 32 may operate based on instruction to identify desired locations for the first drone and the second drone, define the first air borne position and the second air borne position based on the desired locations, and confirm the first drone and the second drone are in the desired locations based on feedback from the first positioning sensor and the second positioning sensor. As can be appreciated, this can apply to any number of drones. For example, a third drone may be used in addition to the first and second drones referenced in the example above may facilitate to complete the mission.

Figure 4:
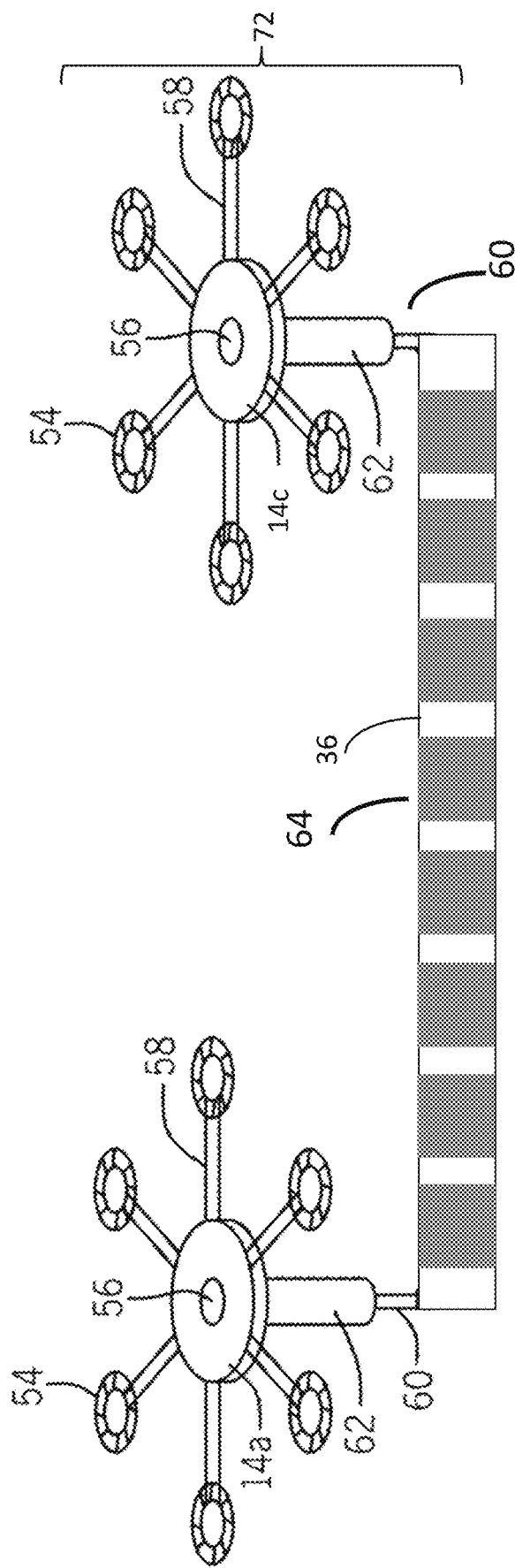
FIG. 4 is an illustration sunlight management film is supported by more than one drones.
Figure 5:
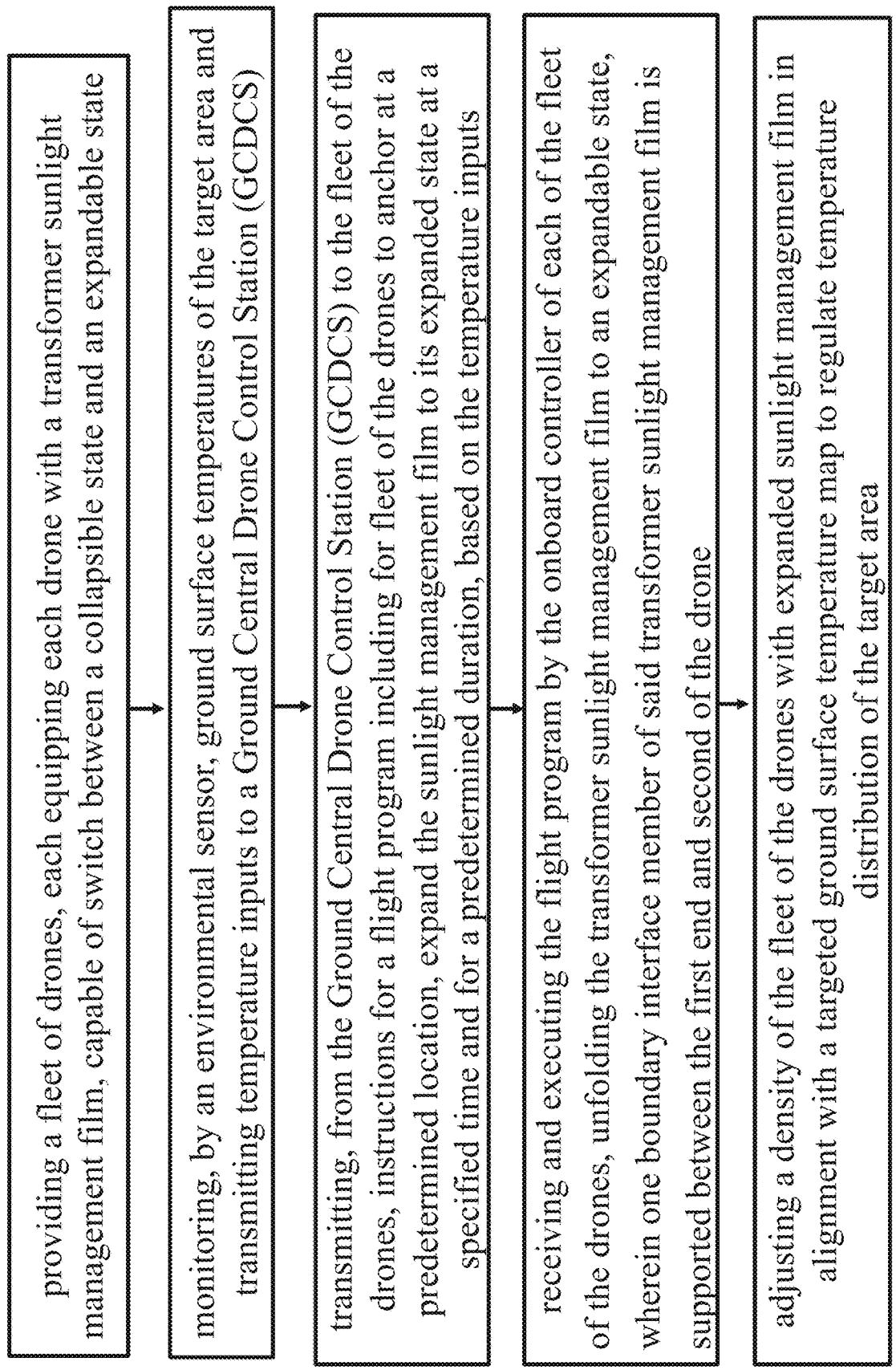
FIG. 5 is a flow diagram of a drone system according to the aspect of the invention.

In one embodiment, FIG. 4 is a perspective view of a first drone 14*a*, a second drone 14*b*, and the electronic conductive tether 36. The first drone 14*a* and the second drone 14*b* may include propellers 54 coupled to a body 56 by struts 58. The electronic conductive tether 36 may be coupled to each of the first drone 14*a* and the second drone 14*b* via a respective coupler 60 (e.g., an offsetting rigid connection or a component of a body of the drone). The coupler 60, which may be capable of articulation (e.g., may include articulation joints and controlled actuators to activate articulation), may enable an extension to create distance between the drone and the electronic conductive tether 36 which may prevent entanglement. In some embodiments, the coupler 60 (e.g. offsetting rigid component) may extend away from the first drone body 56 transversely to an axis of rotation of a propeller 54 of a first propeller system. As disclosed herein, the electronic conductive tether 36 further includes the plurality of sunlight management films 64. As illustrated, the electronic conductive tether 36 is positioned on an underside of the first drone 14*a* and the second drone 14*b*. However, other orientations are also contemplated. Indeed, in an embodiment having an articulable version of the coupler 60, orientation can be dynamic (e.g., changed prior to or even during flight). The sunlight management films can roll up around the coupler to transform from an expanded state to the collapsible state while the drone spins. It should be noted that any drone described herein may include some or all of the same components as the first drone 14*a* and the second drone 14*b*.

In some embodiments, the electronic conductive tether 36 may be coupled and uncoupled from each drone of the fleet of drones 14 by an operator. For example, the first drone 14*a* and second drone 14*b* may be fully modular such that the electronic conductive tether 36 and other components (e.g., a controller) may be removed from the first drone 14*a* and the second drone 14*b* by an operator and replaced by another electronic conductive tether 36. In another embodiment, the first drone 14*a* and second drone 14*b* may be partially modular, whereby an onboard controller (e.g., onboard controller 32, see FIG. 1) is housed within a base 62 of the respective drone (e.g., first drone 14*a* or second drone 14*b*) and the coupler 60 is removable and replaceable. In yet another embodiment, the electronic conductive tether 36 may include the plurality of sunlight management films. In some embodiments, one or more drones (e.g., the second drone 14*b*) may be designed to decouple from the electronic conductive tether 36 during flight or operation. For example, sunlight management film is a transformative sunlight management film. In one example, sunlight management film is supported between drone 14*a* and 14*b*, drone 14*b* can first drop the one end of the tether attached to the sunlight management drone, to help the tether and sunlight management film assembly to roll up to a collapsed state. The drone 14*a* could retain a connection with the electronic conductive tether 36 while the drone 14*b* decouples from the conductive tether 36, allowing it to roll up when drone A spins. The electronic conductive tether 36 and sunlight management films are configured to be fully flexible.

As provided herein, a fleet of drones 14 may operate to execute a flight plan to accomplish a mission, including position at what position for how long, to reduce ground temperature to certain range. FIG. 4 is a perspective view of a fleet of drones 14 (e.g., 14*a*, 14*b*, 14*c*) to reduce temperature quickly. The fleet of drones may each include the electronic conductive tethers 36 coupled to each drone of the fleet of drones 14. The electronic conductive tether 36 may be a single electronic conductive tether line that may couple each drone of the fleet of drones 14 to one another at a predetermined distance along the length of the single tether of the electronic conductive tether 36. In some embodiments, each drone of the fleet of drones 14 may be coupled to two or more drones of the fleet of drones 14. As such, each drone of the fleet of drones 14 may have a single electronic conductive tether 36 coupled to the coupler 60 or multiple electronic conductive tethers 36 coupled to the coupler 60. When instructed, the fleet of drones 14 may create the air borne mission, which may consist of various missions, configurations, structures, or sizes. The mission 72 is created by the electronic conductive tethers 36 coupled to each drone of the fleet of drones 14. The electronic conductive tethers 36 may each include a plurality of sunlight management films that may emit light of various and/or changing types. For example, the plurality of sunlight management films on the electronic conductive tethers 36, which may be positioned to create the mission 72, may each be a first color (e.g., red). The plurality of sunlight management films on the electronic conductive tethers 36 may then transition to a second color (e.g., blue) when instructed to by the Ground Central Drone Control Station 12. Further, the electronic conductive tethers 36 may emit steady light, transitioning light or a blinking light of the same or multiple colors. In this manner, the guests of the amusement park can experience an air borne mission of various colors and effects. It should be noted that the fleet of drones 14 may operate in the same manner as described in FIG. 1.

As disclosed herein, each drone of the fleet of drones 14 may move in any direction to create the air borne mission. The Ground Central Drone Control Station 12 (FIG. 1) may determine desired locations for each drone of the fleet of drones 14 and may send instructions to a single drone or each drone of the fleet of drones 14 to execute a flight plan. A single drone may have the drone controller 32 and may manage the execution of the flight plan or flight path for the fleet of drones 14 that do not have their own controller. Alternatively, each drone 14a, 14b, 14c, 14d, 14e, 14f, and 14g of the fleet of drones 14 may include a respective sensor or aspect of the drone controller 32 to facilitate coordination amongst the fleet of drones 14. In some embodiments, the fleet of drones 14 may be instructed create a first density with sunlight management film at a first orientation and subsequently change air borne formation to create a second density with sunlight management film at a second orientation. In an embodiment, the fleet of drones 14 may be instructed to fly using the air borne formation. As such, the fleet of drones 14 may transition into various missions. The Ground Central Drone Control Station 12 may use the telemetry and/or position circuitry 38 (FIG. 1) to verify that each drone of the fleet of drones 14 is in the proper position based on the geographic location or GPS coordinates of each drone of the fleet of drones 14 and is thus accomplish the mission as instructed. Moreover, the electronic conductive tethers 36 may be coupled to the power source 40 (FIG. 1) that is configured to give power to the fleet of drones 14. The Ground Central Drone control system 12 has or generates a mapped relationship of the fleet of drones 14 and the electronic conductive tethers 36. The Ground Central Drone control system 12 takes this mapped relationship into account when instructing the fleet of drones 14 to maneuver so that tangling and interference between the electronic conductive tethers 36, the individual drones (e.g., drones 14a, 14b, 14c) in the fleet of drones 14, or both do not interfere with each other or become tangled.

FIG. 4 is a perspective view of the first drone 14a, the second drone 14b, and the electronic conductive tether 36. The electronic conductive tether 36 is coupled to the first drone 14a and the second drone 14b via the coupler (off-setting rigid coupling) 60. As disclosed herein, the electronic conductive tether 36 may be in the form of a mesh and may include the plurality of sunlight management films and/or sensors 64 extended along the mesh. As illustrated, the electronic conductive tether 36 is positioned on an underside of the first drone 14a and the second drone 14b. However, other orientations are also contemplated. It should be noted that any drone described herein may include some or all of the same components as the first drone 14a and the second drone 14b. In some embodiments, the electronic conductive tether 36 may be coupled and uncoupled from each drone of the fleet of drones 14 by an operator.

The fleet of drones 14 may operate to execute a flight plan to provide a coordinated air borne mission at a desired location and a desired time.

The fleet of drones may include the electronic conductive tethers 36 coupled to each drone of the fleet of drones 14. When operated, the fleet of drones 14 may create the air borne mission which may consist of drones are positioned at each individual GPS locations with a fix density, controlling orientations of the sunlight configurations using the electronic conductive tethers 36. It should be noted that the fleet of drones may operate in the same manner as described in FIG. 1.

In operation, the fleet of drones 14 may include the electronic conductive tethers 36 coupled to each drone. Each member of the fleet of drones 14 may be instructed, by the Ground Central Drone Control Station 12 (FIG. 1), to fly to a respective air borne position (e.g., move from a first air borne position to a second air borne position) to expand the electronic conductive tethers 36 and hence transform the sunlight management film from collapsible state to expanded state, which may include the mesh. The fleet of drones 14 may fly to extend the electronic conductive tethers 36 with sunlight management films which may include the mesh into various configurations (e.g., moving from a first air borne position to a second air borne position and then to a third air borne position, to achieve an optimal performance for ground surface temperature reduction in an efficient manner). In an embodiment, the fleet of drones 14 may include peripheral drones coupled to the peripheral edges of the mesh of the electronic conductive tethers 36. Further, at least one drone 14 of the fleet of drones 14 may be a central drone coupled to a central portion of the mesh of the electronic conductive tethers 36. As disclosed herein, the plurality of sunlight management films extending along the electronic conductive tethers 36. The Ground Central Drone Control Station 12 may use the telemetry and/or position circuitry 38 (FIG. 1) to verify that each drone of the fleet of drones 14 is in the proper position based on the geographic location or GPS coordinates of each drone of the fleet of drones 14 and is thus missioning the air borne image as instructed.

FIG. 4 is a perspective view of a fleet of drones 14 coupled together via the electronic conductive tether 36 and the plurality of sunlight management films disposed along the electronic conductive tether 36. The electronic conductive tethers 36 including the plurality of sunlight management films may be coupled to the power source 40 (FIG. 1) that is configured to give power to the fleet of drones 14, as well as the plurality of sunlight management films. Ground Drone Control Station 12 (FIG. 1) may send instructions to the fleet of drones 14 to move to an air borne position to enable the fleet of drones 14 to provide the air borne mission. Present embodiments may utilize tracking equipment (e.g., GPS, cameras, RFID) to track a position of unknown object and may control positioning of individual drones of the fleet of drones 14, taking into account target ground temperature map, data from the environmental sensors and sensors date from each drone.

Sunlight Management Films and Transformation

In one embodiment, the sunlight management film is supported between the first and second ends of each drone through a boundary interface member.

In another embodiment, the sunlight management film is secured to the base of the drone by a coupler and tether assembly. This tether assembly facilitates the transfer of electrical energy generated by the sunlight management film directly to the attached drone.

An orientation sensor is operatively attached to the sunlight management film, enabling the measurement of its angle relative to the ground, which can be adjusted according to the angle of incoming sunlight for optimal performance.

In one example, the sunlight management film is pre-attached to the drone prior to takeoff. In another example, one end of the sunlight management film is retrieved and connected to the coupler by the drone once the film is deployed in its expanded state. Additionally, in a further example, the sunlight management film is supported by both a master drone and a slave drone at ground level; as the drones ascend, they gradually separate, thereby expanding the sunlight management film to its operational state, expanded state.

In one embodiment, the sunlight management film is constructed using Perovskite solar cells on PET or polyimide substrates, with a total thickness ranging from 50 to 150 microns. PET substrates offer flexibility and lightweight properties, while polyimide substrates add temperature resistance. In another embodiment, Copper Indium Gallium Selenide (CIGS) solar cells are applied on PET or polyimide substrates, with cell thickness between 2 to 3 microns and an overall thickness of 52 to 153 microns. The use of CIGS cells necessitates slightly thicker substrates to ensure structural stability. Additionally, Organic Photovoltaics (OPVs) may be utilized on PET or polyimide, with a total thickness between 50 and 100 microns, providing a thin, flexible option for sunlight management films.

The area density of PET substrates ranges from approximately 1.3 to 1.4 $g/cm^3$ in volumetric density. In one example, the thin film PET as a substrate is used. The thin film PET substrate ranges 100 to 200 microns thickness and weighs 10 to 20 $mg/cm^2$. In another example, ultra-thin PET film is used as a substrate. The ultra-thin PET film is at 50 microns in thickness, the area density may be closer to 5 $mg/cm^2$. In one embodiment, the sunlight management films is uses a modular 1 m×1 m PET sheet, with an area density of 20 $mg/cm^2$, which would weigh approximately 0.2 kg (200 grams). In another embodiment, the sunlight management film uses a modular 10 m×10 m PET sheet as a substrate, having an area density ranging between 5 to 20 $mg/cm^2$, would weigh between approximately 5 kg and 20 kg.

In one embodiment, commercially available drones possess payload capacities in the range of approximately 5 to 15 kg is used, which are configured for lighter applications and smaller sunlight management film deployments. In another embodiment, high-end industrial drones, with payload capacities up to approximately 100 kg, are utilized, to support moderate-weight sunlight management films over larger coverage areas.

In yet another embodiment, specialized or custom-built heavy-lift drones, such as multi-rotor configurations, are deployed to manage substantially larger payloads, heavier than 100 kg, or even 50 kg. For instance, where expanded sunlight management film applications require each drone to support weights between approximately 275 kg and 562.5 kg, heavy-lift drones are configured to achieve such payload capacities effectively.

Besides flexible sunlight management drones, each individual drone can further equip a fixed solar cell, which dedicated to convert solar energy to electricity to charge the on board battery of drone.

Ground Temperature Map

The present invention utilizes an initial ground temperature map and a target ground temperature map to facilitate temperature regulation. The initial ground temperature map can be established through two methods. In a first method, a sensor array is placed at specified GPS coordinates across the ground, where it periodically monitors the ground temperature at these locations and transmits the collected data to the Ground Drone Central Control Station. In a second method, a temperature sensor is equipped on a drone, which is then directed to fly over the target area at a low elevation, periodically measuring temperature data and either transmitting it in real time to the Ground Drone Central control Station or relaying it upon landing. The target temperature map is determined based on external input factors, such as the specific temperature requirements of different crop areas or based on historical data related to harvest yields.

Tracking and Response Mechanism for Adjusting Drone Density and Orientation of Sunlight Management Films In one embodiment, the system incorporates sunlight sensors or orientation sensors attached to the drones to continuously monitor the current angle and intensity of sunlight. Each drone, or alternatively a master drone, is equipped with a light sensor. These sensors continuously transmit real-time data regarding the sun's position to the Ground Control Station (GCS) or directly to the onboard controllers of the drones. Based on this sunlight data, the system can dynamically adjust the orientation and tilt of the sunlight management films to maintain optimal angles for maximum efficiency.

In an alternative embodiment, historical weather data, including sunlight incident angles and intensity over time, is used as an input to design a mission or planned activity for the drone fleet. The fleet of drones may adjust its density by modifying the relative altitude of each drone and by adjusting the spacing between neighboring drones. The orientation and tilt of the sunlight management films are further controlled by altering the relative elevation of the master drone and one or more slave drones. Alternatively, the orientation and tilt of the sunlight management films can be adjusted by modulating the relative elevation between the first end and second end of each drone. For example, during peak sunlight hours, the films may be angled more directly to maximize reflection or solar energy harvesting. At lower sun angles, such as in the morning or late afternoon, the films may be repositioned to capture or reflect sunlight more effectively or allow more sunlight to pass to ground to facilitate crop growth.

Onboard Sensors and Fail-Safe Mechanism

To mitigate risks associated with extreme environmental conditions, such as severe weather, airborne pollutants, or foreign objects, each drone—or at a minimum, each master drone—is equipped with a wind sensor and a humidity sensor. The wind sensor measures the speed of ambient air movement, while the humidity sensor detects changes in atmospheric moisture to predict imminent rainfall. If the measured wind speed exceeds a predefined threshold, the drone will initiate a protective response by retracting the flexible sunlight management film around the drone or securing it on the master drone for storage. Alternatively, the drone may prepare to return to the ground station. In one example, the threshold wind speed is set between 15 km/h (9 mph) and 30 km/h (18 mph), and the threshold humidity level is set between 60% and 90%.

This fail-safe mechanism ensures operational integrity and protection of the sunlight management films in the event of adverse environmental conditions.

In an alternative embodiment, weather forecast data is used to plan the mission for the fleet of the drone without advanced sensors.

The present invention features the method to use airborne drone to reduce ground surface temperature. The first step is a preparation step. Said preparation step comprises Preparing the drone fleet by calculating the required number of drones based on the target area size and configuring master and slave drones based on sunlight management film size; equipping drones with onboard controllers, geolocation sensors, orientation sensors, and sunlight management films; setting up and testing the Ground Central Drone Control Station (GCDCS).

The second step is monitoring ground condition step. The step comprising sending off a drone with sensors to collect real-time ground surface temperature, wind speed and slight intensity and transmit the data to the GCDCS.

The third step is a programing step. Based on the data received, analyze environmental data to create a target ground surface temperature map for the crop-growing area and use the temperature map to define specific geolocations and deployment schedules for each drone. Transmit the flight program to the onboard controllers of the drone fleet. The flight program includes time and geolocation of each drone.

The fourth step is a deployment step, which comprising sending off drones to hover at predetermined geolocations and orientations based on the flight program; at the designated time, expanding the transformer sunlight management films to provide shade or reflective coverage; dynamically adjust the number of drones in specific regions to regulate temperature distribution based on the temperature map.

The fifth step is continuous monitor step. The step comprises continuously track the sun's movement and adjust the tilt angle of the sunlight management films to optimize shading and energy efficiency and modifying the positioning and angle of the films to maintain stability under varying wind conditions; retracting the sunlight management films using a tension cable while drones maintain altitude.

When the mission is accomplished, the step is directing drones to either return to base for recharging and storage or reposition to another area for continued deployment.

Additionally, when the sunlight management film comprises embedded photovoltaic cells. The system uses embedded photovoltaic cells in the sunlight management films to collect solar energy, storing it in onboard batteries for extended operation; further utilizing stored energy to ensure drone functionality during nighttime or cloudy conditions.

Furthermore, if wind speeds exceed a predetermined threshold, retracting the sunlight management films and direct drones to return to base for safety; and continuously assessing drone operational status and battery levels to prevent system failures.

Furthermore, method steps may further include for larger sunlight management films, coordinating between two or more drones to increase shaded coverage; and reprogram the drone fleet based on changing crop requirements, environmental conditions, or heatwave events.

The method disclosed herein is configured to achieve Heatwave Mitigation, including during peak sunlight hours, sending a fleet of drones to reduce ground surface temperatures by 3° C. to 5° C.; and concentrating shading over heat-sensitive crops such as lettuce and berries.

Experimental

Our farm spans 9,000 square meters is implemented the invention disclosed herein. A system including a fleet of 40 high-altitude multi-rotor drones is provided. Each drone is equipped with a 5-meter by 5-meter sunlight management film, providing a coverage area of 25 square meters per drone. At any given time, up to 1,000 square meters of the farm (about ⅑ of the total area) can be directly shaded by these films.

The ultra-lightweight reflective film is embedded with thin-film organic photovoltaic (OPV) cells, which reflect or absorb 80% of incoming sunlight, effectively lowering the solar load on the ground while converting 10% of intercepted sunlight into electrical energy.

This design provides a cooling effect on the farm, reducing heat stress on sensitive crops.

The fleet of the drones are programmed to hover at 50 meters above ground, maintaining a safe altitude that does not interfere with farming activities while providing effective temperature modulation. The fleet of the drones autonomously form a grid pattern, concentrating coverage on heat-sensitive areas such as crops prone to high-temperature stress. Throughout the day, they can dynamically adjust their positions based on solar intensity, crop requirements, and wind conditions, ensuring optimal cooling and energy efficiency across the farm.

During peak sunlight hours, when ambient temperatures reach around 35° C., the deployment of sunlight management films has been shown to reduce surface temperatures by 3° C. to 5° C., under what environmental conditions.

Each drone is equipped with onboard solar panels and sunlight management film that collectively generate up to 5 kW of power per hour under full sunlight. This energy sustains drone operation throughout the day. Additionally, the drones are fitted with battery packs capable of storing 20 kWh of energy, which allows for continuous operation during nighttime or cloudy conditions. All drones are wirelessly connected to a central control station that monitors real-time weather and temperature data, directing the drones to the areas of the farm that require the most cooling.

The entire system has proven cost-effective and feasible, leveraging commercially available drones and sunlight management film technology. For approximately $20,000, we deployed the 40-drone setup, which serves as an adaptable, renewable solution to protect temperature-sensitive crops like lettuce and berries from extreme heat. Our preliminary results indicate that reducing crop temperatures below critical heat stress thresholds can boost yields by up to 15% during heatwave events, demonstrating the potential impact of this setup as both a solution for individual farms and as a scalable model for broader agricultural applications.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In the scope of the present invention, the local controller, on board controller remote computer device, slave controller, processing unit are all one or more processors. The steps of mapping and calculating are performed by one or more processors.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention. While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

The invention claimed is:

1. A method for enhancing agricultural productivity by managing ground surface temperature and light exposure in crop-growing areas, comprising:
    providing a fleet of drones, each having an onboard controller configured to control and track each individual geolocation and orientation, equipping each drone with a transformer sunlight management film, capable of switch between a collapsible state and an expandable state;
    preparing at least part of said transformer sunlight management film in its collapsible state to be secured to a corresponding drone;
    monitoring, by an environmental sensor, ground surface temperatures of the target area and transmitting temperature inputs to a Ground Central Drone Control Station (GCDCS);
    transmitting, from the Ground Central Drone Control Station (GCDCS) to the fleet of the drones, instructions for a flight program including for fleet of the drones to anchor at a predetermined location, expand the sunlight management film to its expanded state at a specified time and for a predetermined duration, based on the temperature inputs;
    tracking, by the GCS, each drone's individual geolocation and orientation;
    receiving and executing the flight program by the onboard controller of each of the fleet of the drones, unfolding the transformer sunlight management film to an expandable state, wherein one boundary interface member of said transformer sunlight management film is supported between the first end and second of the drone;
    and adjusting a number of and density of the fleet of the drones with expanded sunlight management film in alignment with a targeted ground surface temperature map to regulate temperature distribution of the target area.

2. The method of claim 1, wherein the individual geolocation includes a GPS location and orientation is characterized by one orientation sensor attached to the sunlight management film.

3. The method of claim 1, wherein the transformer sunlight management film is selected from a reflective film, a solar film and mixture of both.

4. The method of claim 1, wherein when the sunlight management film in its collapsible state, it is rolled up, folded in layers in a compact mode and when the sunlight management film is in its expandable state, it is completely extended to expose its surface.

5. The method of claim 1, wherein the boundary contact member is one or two corners of the transformer sunlight management film, or the boundary interface member is one edge of the transformer sunlight management film.

6. The method of claim 1, further comprising providing an additional drone to support a transformer sunlight management film.

7. The method of claim 1, further comprising real-time tracking and response mechanisms for changing sunlight angles, boosting energy efficiency.

8. The method of claim 7, further comprising adjusting a tilt angle of the sunlight management film's based on wind speed and direction.

9. The method of claim 1, further comprising retracting the transformer sunlight management film by withdrawing the tension cable and while maintaining its altitude position.

10. The method of claim 1, further comprising returning the transformer sunlight film in the storage compartment and preparing the drone for next deployment, returning to base or reposition to another area.

11. The method of claim 1, further comprising supporting the transformer sunlight film between two drones and preparing the drone for next deployment, returning to base or reposition to another area, without retracting the expanded the transformer sunlight film.

12. The method of claim 2, further comprising storing excess solar energy harvested by the sunlight management film in onboard batteries for future use by the drones.

13. The method of claim 1, further comprising a fail-safe mechanism that retracts the sunlight management film and returns the drone to a base location if the wind speed exceeds a predetermined threshold.

14. A system to reduce ground surface temperature for an area, comprising:
    a fleet of drones, each drone comprising a body, multiple motors, a first end and second end of the body, said body is equipped with a first group sunlight management films on a surface area of the body; between the first and second end, each drone further comprises a sunlight management film configured to reflecting sunlight and converting sunlight to electricality charging on board battery for the drone;
    a Ground Control Station (GCS) communicatively coupled to the fleet of the drones, wherein the GCS is configured to: transmit a flight program and a sunlight management program, wherein the flight program and sunlight management program are synchronized in time and events to track the geoposition of the fleet of drones and
    an environmental sensor to measure and track ground surface temperature, sending input temperature information to the Ground Control Station (GCS);
    an onboard controller for each of the fleet of drones configured to communicatively coupled to the GCS for receiving and executing the flight program; and adjusting the fleet of the drones with expanded sunlight management film in alignment with a targeted ground surface temperature map to manage temperature distribution of the target area.

15. The system of claim 14, wherein the sunlight management film comprises sunlight reflective film and sunlight harvesting film.

16. The system of claim 15, wherein the distance between each drone is dynamically adjusted based on the geolocation of the drone fleet and the target ground surface temperature.

17. The system of claim 15, wherein a density of the plurality of sunlight management films is controlled based on the geoposition of a fleet of drones with respect to a varying position of the ground surface temperature, wherein the data associated with the varying position of the ground surface temperature is fed to the sunlight management film through control unit by the GCS in real time.

18. The system of claim 14, wherein the orientation of the plurality of sunlight management films is controlled based on a planned activity time stamp of an event and the geoposition of the fleet of drones with respect to the position of the ground surface temperature.

19. The system of claim 14, further comprising additional environmental sensors on each drone, selected from humidity, wind speed, or pressure sensors, to adjust each drone's position and orientation in response to real-time environmental conditions.

20. The system of claim 14, wherein the number of drones deployed is dynamically adjusted by the GCS in real-time, depending on the size of the target area and specific temperature requirements.

\* \* \* \* \*